(12) United States Patent
Mao et al.

(10) Patent No.: US 9,639,318 B2
(45) Date of Patent: May 2, 2017

(54) SYSTEMS AND METHODS FOR SHARING IMAGE DATA

(71) Applicant: Tencent Technology (Shenzhen) Company Limited, Shenzhen (CN)

(72) Inventors: Xiao Bo Mao, Shenzhen (CN); Bo Song Chen, Shenzhen (CN); Xin Hui Zhang, Shenzhen (CN); Can Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 573 days.

(21) Appl. No.: 14/088,266

(22) Filed: Nov. 22, 2013

(65) Prior Publication Data
US 2014/0085167 A1    Mar. 27, 2014

Related U.S. Application Data

(63) Continuation of application No. PCT/CN2013/076997, filed on Jun. 8, 2013.

(30) Foreign Application Priority Data

Sep. 26, 2012   (CN) ........................ 2012 1 0363513

(51) Int. Cl.
*G09G 5/00*    (2006.01)
*G06F 3/14*    (2006.01)

(52) U.S. Cl.
CPC .......... *G06F 3/1423* (2013.01); *G06F 3/1454* (2013.01); *G09G 2356/00* (2013.01)

(58) Field of Classification Search
CPC . H04L 12/581; H04L 12/5815; G06F 3/1423; G06F 3/1454; G09G 2356/00
See application file for complete search history.

(56) References Cited

U.S. PATENT DOCUMENTS 6,670,933 B1 * 12/2003 Yamazaki ............. G06F 3/1454
                                                      340/4.62
6,867,749 B1 *  3/2005 Il ........................ G05B 19/0421
                                                      345/1.1
(Continued)

FOREIGN PATENT DOCUMENTS

CN    101888302    11/2010
CN    101964076     2/2011
(Continued)

OTHER PUBLICATIONS

International Search Report and Written Opinion mailed Sep. 19, 2013, directed to International Application No. PCT/CN2013/076997; 12 pages.
(Continued)

*Primary Examiner* — Amare Mengistu
*Assistant Examiner* — Crystal A Mathews
(74) *Attorney, Agent, or Firm* — Anova Law Group, PLLC

(57) ABSTRACT

This provides a method, device, and system for sharing image data. When detecting an image being rendered on an image-rendering interface of its rendering application, a first terminal can obtain image information of the image being rendered and location information associated with the image information. The first terminal can transmit a first image data to a server, the first image data including the image information and location information. The server can transmit the first image data to a second terminal which shares images with the first terminal, the second terminal also equipped with an image rendering application. The second terminal can receive the first image data and render an image based on the image information at a location corresponding to the location data on an interface of its image-rendering appli-
(Continued)

cation. This can facilitate image data sharing among multiple terminals.

19 Claims, 7 Drawing Sheets

(56) References Cited

U.S. PATENT DOCUMENTS

| | | | | |
|---|---|---|---|---|
| 7,356,563 | B1* | 4/2008 | Leichtling | G06Q 10/06 345/2.1 |
| 7,379,031 | B2* | 5/2008 | Emerson | G06F 3/038 345/1.1 |
| 7,439,937 | B2* | 10/2008 | Ben-Shachar | G06F 3/1438 345/1.1 |
| 7,596,563 | B1* | 9/2009 | Dickson | G06F 21/335 |
| 7,711,681 | B2* | 5/2010 | Dempski | G06F 9/542 345/1.1 |
| 7,720,864 | B1* | 5/2010 | Muth | G06F 17/30171 707/707 |
| 7,847,755 | B1* | 12/2010 | Hardebeck | G06F 3/1415 345/2.1 |
| 8,060,659 | B2* | 11/2011 | Ichieda | G06F 3/14 345/1.1 |
| 8,266,245 | B1* | 9/2012 | Saviano | G06F 21/6218 709/203 |
| 8,266,684 | B2* | 9/2012 | Kline | G01R 31/31705 713/189 |
| 8,332,898 | B2* | 12/2012 | Taylor | H04L 67/1095 345/2.2 |
| 2002/0126135 | A1* | 9/2002 | Ball | G06F 3/14 345/600 |
| 2002/0143972 | A1* | 10/2002 | Christopoulos | H04L 29/06027 709/231 |
| 2004/0015585 | A1* | 1/2004 | McBrearty | H04L 63/105 709/225 |
| 2004/0162877 | A1* | 8/2004 | Van Dok | G06F 3/0481 709/204 |
| 2005/0044143 | A1* | 2/2005 | Zimmermann | H04L 51/04 709/204 |
| 2005/0060377 | A1* | 3/2005 | Lo | G06Q 30/02 709/206 |
| 2005/0066070 | A1* | 3/2005 | Klassen | G06F 15/02 710/1 |
| 2005/0287990 | A1* | 12/2005 | Mononen | G06F 21/335 455/411 |
| 2006/0026226 | A1* | 2/2006 | Walls | G06T 1/20 709/201 |
| 2006/0041848 | A1* | 2/2006 | Lira | G06Q 10/107 715/805 |
| 2006/0069736 | A1* | 3/2006 | Czeisler | H04L 67/34 709/207 |
| 2006/0149825 | A1* | 7/2006 | Kim | H04L 12/581 709/207 |
| 2006/0190535 | A1* | 8/2006 | Kaitaniemi | G06F 17/30575 709/203 |
| 2007/0248070 | A1* | 10/2007 | Choi | H04L 12/581 370/338 |
| 2007/0273913 | A1* | 11/2007 | Nakata | G06F 21/608 358/1.14 |
| 2008/0244615 | A1* | 10/2008 | Kropivny | H04L 12/1822 719/315 |
| 2008/0284779 | A1* | 11/2008 | Gu | G06T 13/40 345/419 |
| 2010/0043065 | A1* | 2/2010 | Bray | H04L 63/0815 726/8 |
| 2010/0122334 | A1* | 5/2010 | Stanzione | G06Q 10/0637 726/11 |
| 2010/0164685 | A1* | 7/2010 | Pering | G10L 17/00 340/5.83 |
| 2010/0165392 | A1* | 7/2010 | Yabe | G06F 21/6218 358/1.15 |
| 2010/0318634 | A1* | 12/2010 | Chen | H04L 12/581 709/219 |
| 2011/0093925 | A1* | 4/2011 | Krishnamoorthy | G06F 21/6218 726/4 |
| 2011/0125894 | A1* | 5/2011 | Anderson | H04L 9/3213 709/224 |
| 2011/0126197 | A1* | 5/2011 | Larsen | H04L 9/3213 718/1 |
| 2011/0141953 | A1* | 6/2011 | Wright | H04L 63/123 370/310 |
| 2011/0202971 | A1* | 8/2011 | Margolin | H04L 67/10 726/3 |
| 2011/0270934 | A1* | 11/2011 | Wong | H04L 51/04 709/206 |
| 2012/0011568 | A1* | 1/2012 | Tahan | G06F 3/0481 726/4 |
| 2012/0096368 | A1* | 4/2012 | McDowell | G06F 9/543 715/748 |
| 2012/0124389 | A1* | 5/2012 | Villani | G06F 21/84 713/189 |
| 2012/0127196 | A1* | 5/2012 | Landry | G06F 3/147 345/619 |
| 2012/0221639 | A1* | 8/2012 | Mallet | G06Q 50/01 709/204 |
| 2012/0303452 | A1* | 11/2012 | Xue | H04L 12/5805 705/14.49 |
| 2013/0058262 | A1* | 3/2013 | Parreira | G06F 17/2247 370/276 |
| 2013/0060875 | A1* | 3/2013 | Burnett | H04N 21/4788 709/206 |
| 2013/0066975 | A1* | 3/2013 | Kantor | G06F 21/335 709/205 |
| 2013/0139225 | A1* | 5/2013 | Saito | G06F 21/608 726/4 |
| 2013/0139241 | A1* | 5/2013 | Leeder | H04W 12/06 726/9 |
| 2014/0025757 | A1* | 1/2014 | Haugen | H04L 51/10 709/206 |
| 2015/0169633 | A1* | 6/2015 | Yee | G06F 17/3028 707/723 |
| 2015/0188860 | A1* | 7/2015 | Zhang | H04L 63/0428 715/752 |
| 2015/0200948 | A1* | 7/2015 | Cairns | G06F 21/44 726/4 |

FOREIGN PATENT DOCUMENTS

| | | |
|---|---|---|
| CN | 102646235 | 8/2012 |
| JP | 2004128614 A | 4/2004 |
| JP | 2009093219 A | 4/2009 |
| JP | 2012014370 A | 1/2012 |

OTHER PUBLICATIONS

Third Office Action dated Dec. 9, 2015, directed towards CN Application No. 201210363513.X with concise explanation of relevancy; 15 pages.

First Office Action dated Aug. 4, 2014, directed to CN Application No. 201210363513.X with concise explanation of relevancy; 12 pages.

Second Office Action dated Jul. 8, 2015, directed to CN Application No. 201210363513.X with concise explanation of relevancy; 14 pages.

* cited by examiner

SYSTEMS AND METHODS FOR SHARING IMAGE DATA

CROSS REFERENCE TO RELATED APPLICATION

This application is a U.S. continuation application under 35 U.S.C. §111(a) claiming priority, under 35 U.S.C. §120 and 365(c), to International Application No. PCT/CN2013/076997 filed on Jun. 8, 2013, which claims the priority benefit of Chinese Patent Application No. 201210363513.X, filed on Sep. 26, 2012, the contents of both the PCT application and the Chinese application are incorporated by reference herein in its entirety for all purposes.

FIELD

The present disclosure relates to computer technologies, and in particular, to a method, device, and system for sharing data such as image data.

BACKGROUND

"Smart mobile terminal" is a general term for describing devices such as a personal computer (PC) having an independent operating system and can be installed with software, games, and other third-party programs to expand the functionalities of the device. Among smart mobile terminals, smartphones can use a mobile communication network to facilitate a wireless network.

A user can install, for example, a painting program on a smart mobile terminal to allow the user to edit and render images at any time, and after the image is rendered, transmit the rendered image to a server using wireless communication technologies. The server can then transmit the image to other devices to facilitate image sharing.

Existing image-sharing technology requires that the image be completed or partially completed before it can be transmitted using a device, such as a server, to other terminals for display. However, it is not possible to share an image still being rendered with other terminals.

SUMMARY

Embodiments of the present disclosure can provide a method, device, and system for sharing image data to allow users to share an image as the image is being rendered.

In one embodiment, a method for sharing image data is provided. The method including the following steps: when detecting an image being rendered on an interface of an image-rendering application, a first terminal obtaining image information of the image and location information associated with the image information; the first terminal transmitting to a server a first image data, the first image data comprising the image information and location information; the server transmitting the first image data to a second terminal that shares images with the first terminal, the second terminal installed with an image rendering application; and the second terminal rendering an image based on the received first image data, the image rendered based on the image information and at a location of an image-rendering interface of the image rendering application on the second terminal, the location corresponding to the location information.

The method can further include: when receiving a second image data transmitted by the server, the first terminal rendering an image based on shared image information in the second image data at a location of an image-rendering interface of the image-rendering application on the first terminal, the location corresponding to shared location information in the second image data; wherein the shared image information and shared location information are detected by the second terminal and indicate, respectively, image information of the image being rendered on the rendering interface of the second terminal and a location associated with the image information.

In addition, the server comprises a server for facilitating a data sharing application, and the first terminal and the second terminal establish communication with the server after launching and logging into their respective data sharing applications.

In addition, before the first terminal transmits the first image data to the server, the first terminal installed with the image rendering application, the second terminal that shares images with the first terminal, and the server each sends its own device information to a network server, the device information comprising gateway information for connecting to the corresponding terminal or server; the network server determines whether connections can be established between the first terminal and the server and between the second terminal and the server based on the gateway information; if the first terminal and the server can be connected, the network server transmits all or part of the device information of the first terminal and the server to each other, establishing a connection between the first terminal and the server; and if the second terminal and the server can be connected, the network server transmits all or part of the device information of the second terminal and the server to each other, establishing a connection between the second terminal and the server.

In addition, before the first terminal transmits the first image data to server, the server allocates wireless resources based on a hotspot identification (ID) recorded via a hotspot creating interface, and broadcasts the hotspot ID, the wireless resources comprising wireless network card resources or mobile communication resources; and the first terminal and second terminal use the hotspot ID to connect to the server.

In addition, the server is installed with an image rendering application, the method comprises: the server, when receiving the first image data from the first terminal, on a rendering interface of the image rendering application on the server, renders an image based on the image information in the first image data at a location corresponding to the location information in the first image data; and the server, when receiving the second image data from the second terminal, on the rendering interface, renders an image based on the shared image information in the second image data at a location corresponding to the shared location information in the second image data.

In other embodiments, another method for sharing image data is provided. The method includes: a first terminal installed with an image rendering application, when detecting an image being rendered on a rendering interface of the image rendering application, obtaining image information of the image and location information associated with the image information; the first terminal sending a first image data to a server, the first image data comprising the image information and location information; the first terminal rendering and displaying an image based on the image information at a location corresponding to the location information.

In addition, the method can further include: the first terminal, when receiving a second image data transmitted by the server, rendering on the rendering interface an image based on shared image information in the second image data at a location corresponding to shared location information in the second image data, the second image data comprising shared image information and the shared location information associated with the shared image information; wherein, the shared image information and shared location information are detected by a second terminal and indicate, respectively, image information of the image being rendered on a rendering interface of the second terminal and a location associated with the image information.

In other embodiments, another method for sharing data is provided. The method can include: a server, when receiving a first image data transmitted by a first terminal installed with a first image rendering application, transmitting the first image data to a second terminal installed with a second image rendering application, the second terminal sharing images with the first terminal, the first image data comprising image information and associated location information; and the server, when receiving a second image data transmitted by the second terminal, transmitting the second image data to the first terminal, the second image data comprising shared image information and associated shared location information.

In addition, the method can also include: the server, when receiving the first image data from the first terminal, rendering, on a rendering interface of the first image-rendering application, an image based on the image information in the first image data at a location corresponding to the location information in the first image data; and the server, when receiving the second image data from the second terminal, rendering, on a rendering interface of the second image-rendering application, an image based on the shared image information in the second image data at a location corresponding to the shared location information in the second image data.

In other embodiments, a terminal for sharing image data is provided. The terminal can be installed with an image-rendering application. The terminal includes: an obtaining module that, when detecting an image being rendered on a rendering interface of the image-rendering application, obtains image information and associated location information of the image; a transmitting module that transmits a first image data to a server, the first image data comprising the image information and the location information; a displaying module that displays the rendered image based on the image information at a location corresponding to the location information.

In addition, the terminal can also include: a rendering module that, when receiving a second image data transmitted by the server, rendering, on the rendering interface, an image based on shared image information in the second image data at a location corresponding to shared location information in the second image data, the second image data comprising the shared image information and the associated shared location information; wherein, the shared image information and shared location information are detected by another terminal and indicate, respectively, image information of an image being rendered on a rendering interface of the other terminal and a location associated with the image information.

In other embodiments, a server for facilitating data sharing is provided. The server can include: a communication module that, when receiving a first image data transmitted by a first terminal installed with a first image-rendering application, transmitting a first image data to a second terminal installed with a second image-rendering application, the second terminal sharing images with the first terminal, the first image data comprising image information and associated location information; wherein the communication module, when receiving a second image data transmitted by the second terminal, transmits the second image data to the first terminal, the second image data comprising shared image information and associated shared location information.

In addition, the server is installed with an image-rendering application and can further include: a rendering module that, when receiving the first image data from the first terminal, renders, on a rendering interface of the image rendering application, an image based on the image information in the first image data at a location corresponding to the location information in the first image data; wherein the rendering module, when receiving the second image data from the second terminal, renders, on the rendering interface, an image based on the shared image information in the second image data at a location corresponding to the shared location information in the second image data.

In other embodiment, an image data sharing system is provided. The image data system can include: a first terminal and a second terminal, each installed with an image-rendering application, and a server, wherein the first terminal, when detecting that an image is being rendered on a rendering interface of the image rendering application of the first terminal, obtains image information and associated location information of the image, and transmits a first image data to the server, the first image data comprising the image information and the location information; the server transmits the first image data to the second terminal; and the second terminal that, based on the received first image data, renders, on a rendering interface of the image rendering application of the second terminal, an image based on the image information at a location corresponding to the location information.

In addition, the first terminal, when receiving a second image data transmitted by the server, renders, on the rendering interface, an image based on shared image information in the second image data at a location corresponding to shared location information of the second image data; wherein, the shared image information and shared location information are detected by the second terminal and indicate, respectively, image information of the image being rendered on the rendering interface of the second terminal and a location associated with the image information.

In addition, the server is installed with an image rendering application, and wherein the server, when receiving the first image data from the first terminal, renders, on a rendering interface of the image rendering application on the server, an image based on the image information in the first image data at a location corresponding to the location information in the first image data, and, when receiving the second image data of the second terminal, renders, on the rendering interface of the image rendering application on the server, an image based on the shared image information in the second image data at a location corresponding to the shared location information in the second image data.

The embodiments of the disclosure can provide the following advantages: when detecting a user launching an image-rendering application to render an image, the disclosed system can detect the image information and the location of the image information at any moment and transmit this data to at least one other terminal. The other terminal can render and display an image based on the image information at a location on its image-rendering interface corresponding to the location information. This allows other users to continue to render the image already being rendered using an image-rendering application at the other terminal.

DETAILED DESCRIPTION

Figure 1:
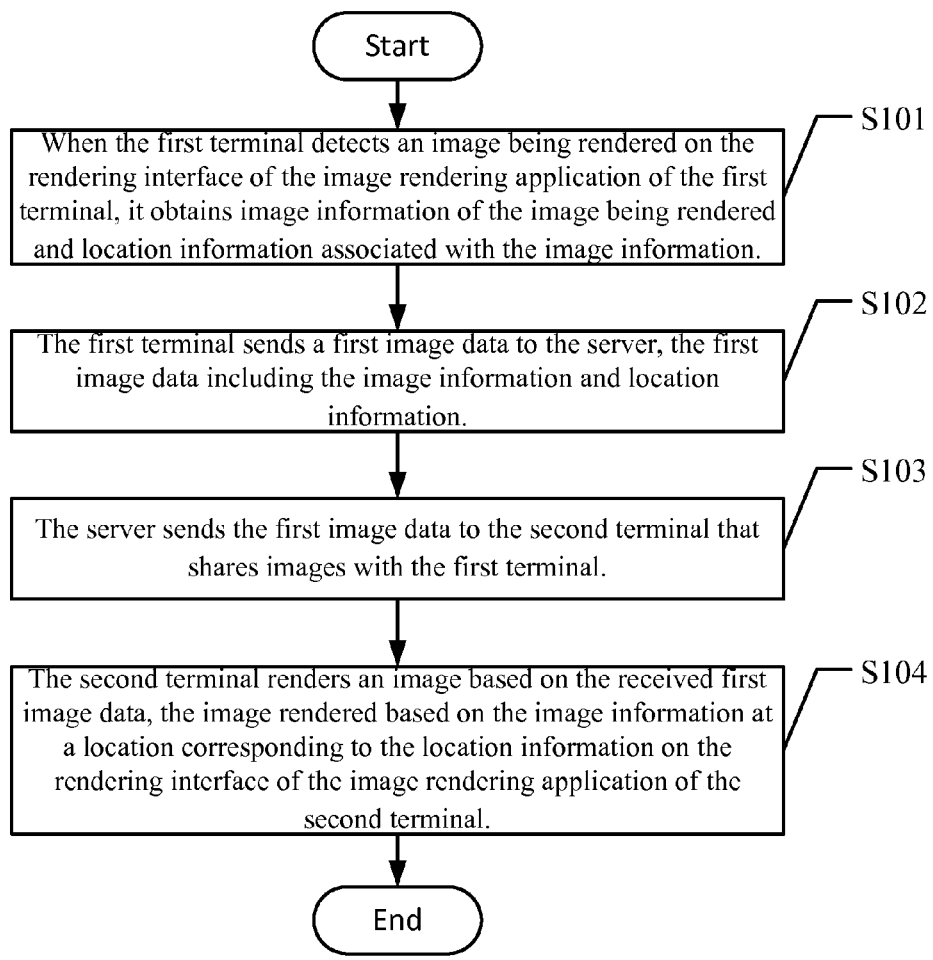
FIG. 1 is a flowchart illustrated the exemplary steps of a method for sharing image data, according to an embodiment of the present disclosure.

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

This generally relates to sharing data among multiple terminals. Although the embodiments below use image data as an exemplary type of data that can be shared using the methods and systems disclosed herein, it should be understood that the data being shared among the terminals is not so limited. In particular, to share data among the terminals, a first terminal can extract image information from an image being rendered in an image-rendering application installed on the first terminal. It can also extract location information associated with the image information. For example, the location information can indicate the boundary of the image or the absolute or relative location of the image on an interface of the image-rendering application. The image information and the location information can be transmitted to a second terminal via a network. When the second terminal receives the image information and the location information from the first terminal, the second terminal can re-render the image based on the received information using an image-rendering application installed on the second terminal. The re-rendered image can essentially be the same image as it was rendered on the first terminal before it was transmitted. It can provide a convenient way for rendering an image on multiple terminals. For example, the user can start rendering the image on his PC at work and continue the process on his iPad after he leaves the office. When he gets home, he can transmit the image data and location data associated with the image to his home laptop to continue the process.

As referred hereinafter, a terminal can be any electronic device capable of connecting to a network for transmitting and receiving data. Such devices can include, but are not limited to, PCs, Macs, desktop computers, laptop computers, tablet PCs, smartphones including iPhones, Android phones, Windows phones, and Blackberries, e-readers, in-car communication devices, televisions and other consumer electronic devices with sufficient network capabilities. In fact, a terminal can also be referred to as a device (i.e., "device" and "terminal" are interchangeable terms). In the embodiments described below, a terminal at which an image is first rendered and from which information associated with the rendered image is transmitted can be referred to as a first terminal or an originating terminal. A terminal at which the information associated with the rendered image is received and the image is re-rendered based on the information can be referred to as a second terminal or a receiving terminal.

A terminal can be both a first terminal and a second terminal in various embodiments of the disclosure. For example, the iPad in the example provided in the previous paragraph can be both a second terminal when it receives the image data from the work PC and a first terminal when it transmits the updated image data to the home laptop. A first terminal and a second terminal can be devices belonging to the same user or different users. For example, an image being rendered on User A's PC can be re-rendered on User A's iPad based on information transmitted from the PC to the iPad via a network. Alternatively, an image being rendered on User A's PC can be re-rendered on User B's iPad in a similar fashion. Essentially, image data or other types of data can be shared among multiple terminals.

Each terminal can have an image-rendering application installed locally for rendering image. Alternatively, it can access a network-based (e.g., Internet-based) image-rendering application for rendering image. An image-rendering application can be any application that can be used to create and edit an image or any other types of graphic objects such as a table, a chart, a slide in a presentation, an animated image, a Web page, etc. The image-rendering application can render, for example, 2D and/or 3D images. Exemplary image-rendering applications can include, but are not limited to, Photoshop, Paint, Google SketchUp, and GNU Image Manipulation Program. Different terminals can use the same image-rendering application or different image-rendering applications as long as they are compatible with the format of the shared data. In some embodiment, the shared data may have to be converted into a particular format when received at a terminal to be compatible with the image-rendering application installed on that terminal.

In the embodiments where the shared data is of other types (e.g., video and audio data), corresponding applications can be required to create and edit the shared data. For example, a video-editing application can be required to edit a video clip and an audio-editing application can be required to edit an audio clip. In addition, the type of information regarding the shared data being transmitted from one terminal to another terminal can also depend on the data type. For example, for audio data, the start point, end point, and/or duration of the clip can be part of the information transmitted between the terminals.

In some embodiments, the information can be transmitted through a server on the network. The server can be one of the terminals on the network and, thus, it can also be used as a first terminal or a second terminal. Accordingly, the server may also have access to an image-rendering application. Additionally or alternatively, the server can be a dedicated server from receiving and forwarding shared data among various terminals. The server can receive shared data from multiple terminals and/or transmit shared data to multiple terminals. In some embodiments, the server can broadcast the shared data simultaneously to multiple terminals. In some embodiments, the server can be a router or a network access point such as a Wi-Fi hotspot. The network connecting the terminals and the server can be any wireless or wired networks, including but not limited to the Internet, local area network (LAN), wide area network (WAN), cellular network, Wi-Fi network, and virtual private network (VPN).

FIG. 1 is a flow diagram illustrated the exemplary steps of a method for sharing image data, according to an embodiment of the present disclosure. In this embodiment, the first terminal, second terminal, and server can establish connections among them. The first and second terminals can both be installed with an image rendering application.

S101: When the first terminal detects an image being rendered on the rendering interface of the image rendering application of the first terminal, it can obtain image information of the image being rendered and location information associated with the image information.

The location information can be used to indicate the location of the corresponding image on the rendering interface. The location information can be location area information including, for example, the position coordinates for each boundary of the image. The image information can indicate the shape, color, and other information associated with the image, so that the image being rendered at the first terminal can be re-rendered at the second terminal.

S102: The first terminal can send a first image data to the server, the first image data including the image information and location information.

The server can be any server providing an instant messaging application or data sharing application. It can also be a terminal serving as a server on a local area network (LAN).

S103: The server can send the first image data to the second terminal that shares images with the first terminal.

The server can record the IP address, account number, and/or other identification (ID) information associated with the second terminal. The server can broadcast the first image data based on the ID information associated with the second terminal.

S104: The second terminal can render an image based on the received first image data. The image can be rendered based on the image information at a location corresponding to the location information on the rendering interface of the image rendering application of the second terminal.

After receiving the first image data, at least one second terminal can render an image at a corresponding location area of the rendering interface, so that the user at the second terminal can continue to render the image on the rendering interface of the second terminal.

In one embodiment, when each terminal simultaneously or successively acts as the first terminal, the server can also manage the transmissions of shared data. The first terminal transmitting the image data can be required to request for a permission token from the server before transmitting any image data to the server. Based on the image data being processed, the server can determine whether to return a token permitting the transmission of the image data in response to the request. For example, when the quantity of the current image data has not reached a predetermined threshold value (e.g., two strips), the server can respond to the request and send the token. Having received the token, the first terminal can transmit image data including image information and location information.

In the embodiments of the present disclosure, when a user launches the rendering software to render an image, the image information and the location of the image information at any particular moment can be detected and sent to at least one other terminal. The other terminal(s) can render and display an image based on the image information at a corresponding location on the graphical interface of its image rendering application. Other users can continue to render the image using the image rendering application at the other terminal(s).

Figure 2:
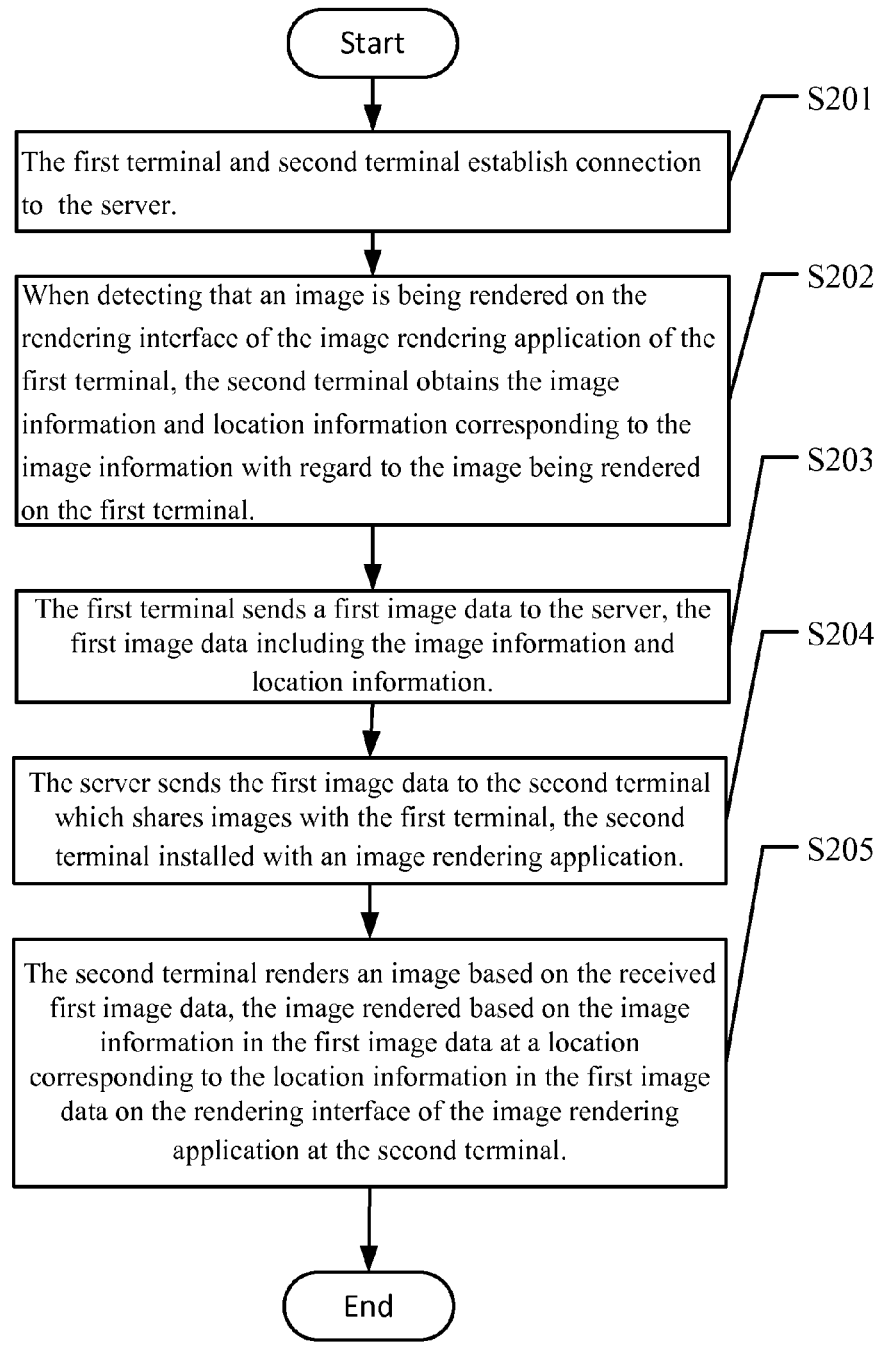
FIG. 2 is a flowchart illustrating another method for sharing image data, according to an embodiment of the present disclosure.

FIG. 2 is a flowchart illustrating another method for sharing image data, according to an embodiment of the present disclosure.

S201: The first terminal and second terminal can establish connection to the server.

In S201, the server can provide an instant messaging application or image data sharing application. The first terminal and second terminal can log onto the server over the network using, for example, their respective accounts for the instant messaging application to establish connections to the server. The first terminal and the second terminal can establish connections to the server using existing technologies.

More specifically, exemplary methods with which the first terminal and second terminal can establish connections with the server are disclosed in the embodiments below in view of FIGS. 3 and 4.

S202: When detecting that an image is being rendered on the rendering interface of the image rendering application of the first terminal, the second terminal can obtain the image information and location information corresponding to the image information with regard to the image being rendered on the first terminal.

S203: The first terminal can send a first image data to the server, the first image data including the image information and location information.

S204: The server can send the first image data to the second terminal which shares images with the first terminal. The second terminal can be installed with an image rendering application.

S205: The second terminal can render an image based on the received first image data. The image can be rendered based on the image information in the first image data at a location corresponding to the location information in the first image data on the rendering interface of the image rendering application at the second terminal.

In addition, when the first terminal receives a second image data sent by the server, the first terminal can render, on a rendering interface, an image based on the shared image information in the second image data at a location corresponding to the shared location information in the second image data. The second image data can include shared image information and shared location information associated with the shared image information. In particular, the shared image information and shared location information can indicate, respectively, the image information of the image being rendered on the rendering interface of the second terminal and a location associated with the image information.

Optionally, if the server is one of the terminals on the LAN installed with an image rendering application, when the server receives the first image data from the first terminal, it can also render an image based on the image information in the first image data on the rendering interface of the image rendering application at the first terminal. The image can be rendered at a location corresponding to the location information in the first image data. When receiving the second image data from the second terminal, the server can also render an image based on the shared image information in the second image data. The image can be rendered on the rendering interface at a location corresponding to the shared location information in the second image data.

In the embodiments of the present disclosure, when it is detected that a user launches the image-rendering application to render image, image information and location information associated with the image information can be obtained at any particular moment and transmitted to at least one other image-sharing terminal. The at least one other image-sharing terminal can render and display locally the image based on the image data at a corresponding location on the graphical interface of an image-rendering application. This allows other users to continue to render the image already being rendered using the image-rending application at the second terminal.

Figure 3:
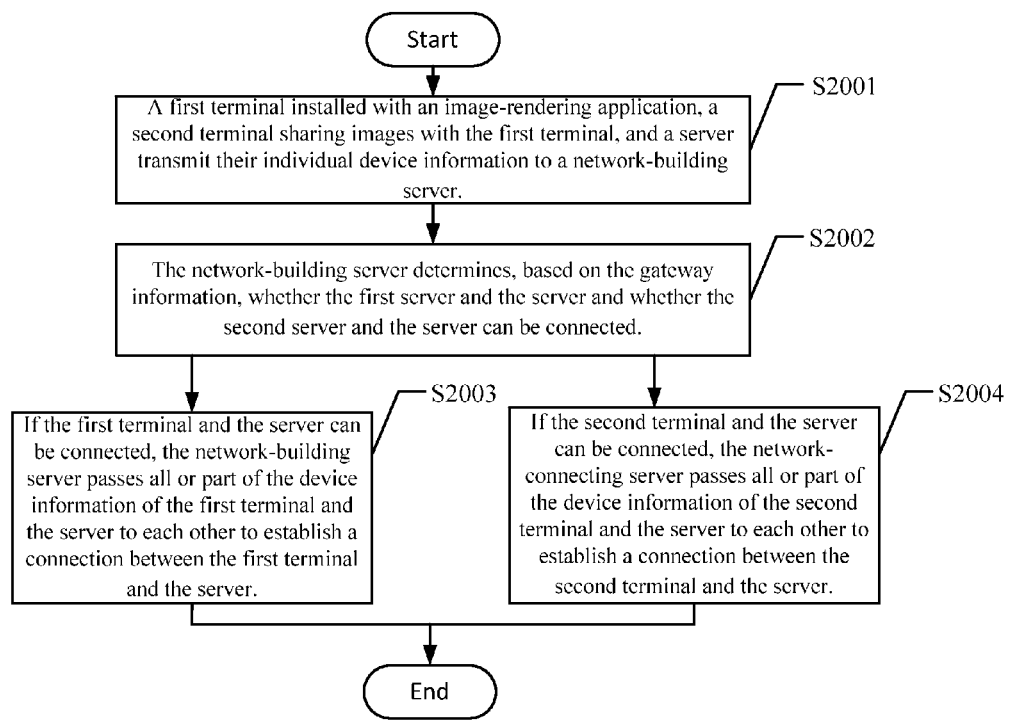
FIG. 3 is a flowchart illustrating the exemplary steps in a method for establishing communication between terminals, according to an embodiment of the present disclosure.

FIG. 3 is a flowchart illustrating the exemplary steps in a method for establishing communication between terminals, according to an embodiment of the present disclosure. The method in this embodiment can include the following steps.

S2001: A first terminal installed with an image-rendering application, a second terminal sharing images with the first terminal, and a server can transmit their individual device information to a network-building server. The device information can include information regarding a network gateway for connecting to the corresponding terminal or server. The network gateway can be a device, such as a router or a Wi-Fi hotspot.

The first terminal, second terminal, and server can connect, through their respective gateway, to the network-building server, which can be used by the user to establish a LAN. The network-building server can be a stand-alone server or a data-sharing server discoverable and connectible on the LAN.

S2002: The network-building server can determine, based on the gateway information, whether the first server and the server and whether the second server and the server can be connected. In particular, it can be determined, based on the device information, whether the gateways of the first terminal and the server are the same and whether the gateways of the second terminal and the server are the same, which can determine whether the corresponding terminals can be connected.

S2003: If the first terminal and the server can be connected, the network-building server can pass all or part of the device information of the first terminal and the server to each other to establish a connection between the first terminal and the server. The first terminal and the server can use information such as their respective IP addresses and access ports to establish a connection with each other.

S2004: If the second terminal and the server can be connected, the network-connecting server can pass all or part of the device information of the second terminal and the server to each other to establish a connection between the second terminal and the server. The all or part of the device information can include, for example, IP addresses and port information. The second terminal and the server can use information such as their respective IP addresses and ports to establish a connection with each other.

This embodiment of the present disclosure, through the third party network-building server for establishing connections, can facilitate device discovery in a LAN to establish connections between devices, even when connections cannot be established in the LAN via broadcasting or multicasting.

Figure 4:
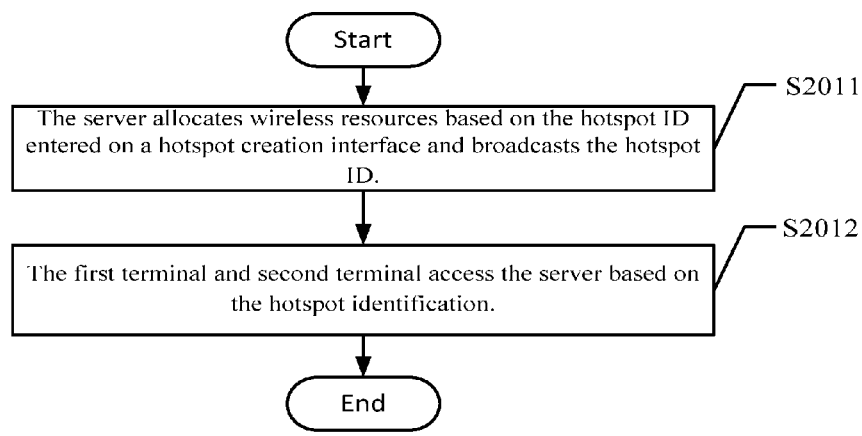
FIG. 4 is a flowchart illustrating the exemplary steps of a method for establishing a connection between terminals, according to an embodiment of the present disclosure.

FIG. 4 is a flowchart illustrating the exemplary steps of a method for establishing a connection between terminals, according to an embodiment of the present disclosure. In this embodiment, the server can be a mobile device, such as a mobile phone, or a personal computer. The method can include the following steps.

S2011: The server can allocate wireless resources based on the hotspot ID entered on a hotspot creation interface and broadcast the hotspot ID. The wireless resources can include wireless network card resources or mobile communication resources. For example, a user can enter a text string of "image sharing" as the hotspot ID on the hotspot creation interface of the server. Alternatively, the text string can be a default text string of a designated format.

The server can allocate wireless resources based on the theme of the hotspot login information. The wireless resources can include wireless network card resources or mobile communication resources.

If the server is a personal computer, then the server can be used for allocating its own wireless network card resources. The server can broadcast the hotspot ID. The hotspot ID can include the theme name of the hotspot login information. The first terminal and the second terminal can access the server based on the hotspot ID.

If the server is a mobile terminal such as a mobile phone, the server can allocate mobile communication resources and, in particular, can associate the 2G or 3 G communication module of the server with a text string in the designated format. The text string in the designated format can be used to indicate that this server can be a hotspot, and the text string itself can be the hotspot ID. When detecting the text string in the designated format, the first terminal and the second terminal can access the server based on the text string.

S2012: The first terminal and second terminal can access the server based on the hotspot identification.

The method with which the first terminal and the second terminal can connect to the server can be the same as existing methods for connecting to various kinds of hotspots based on SSID and, thus, is not be detailed here.

In the embodiment of the present disclosure, the server can create a hotspot on its own so that, when there is no available network, the first terminal and second terminal can also receive and transmit image data using the server's wireless network card resources or mobile communication resources such as 2G/3G resources.

Figure 5:
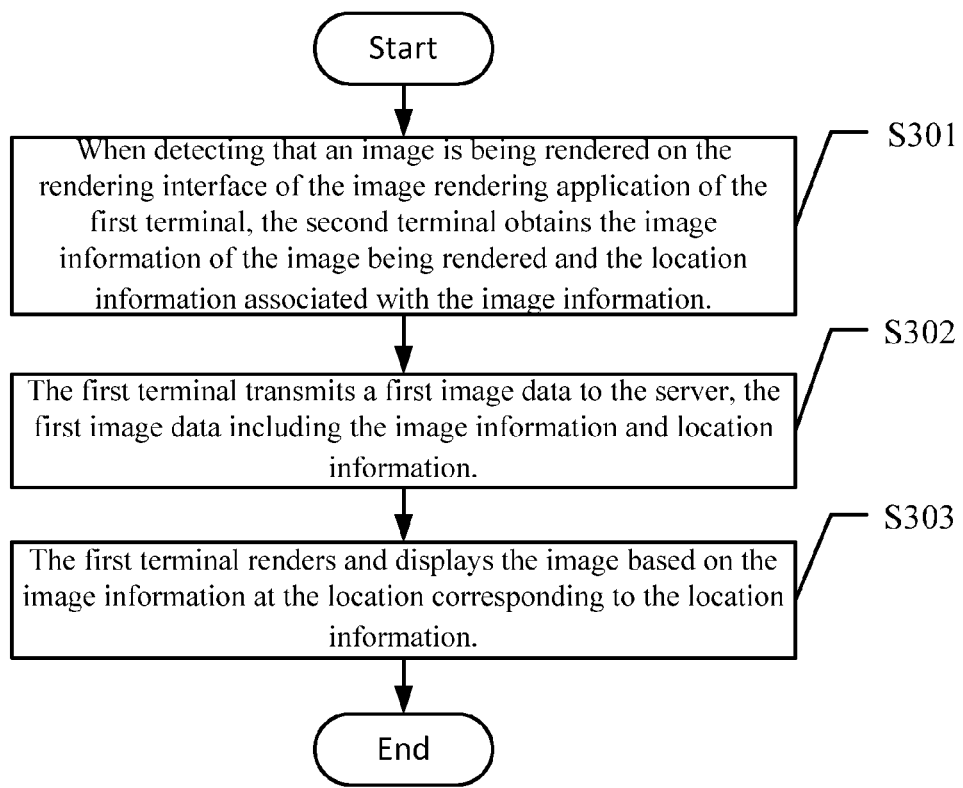
FIG. 5 is a flowchart illustrating the exemplary steps of another method for sharing image data, according to an embodiment of the present disclosure.

FIG. 5 is a flowchart illustrating the exemplary steps of another method for sharing image data, according to an embodiment of the present disclosure. This embodiment describes a method for sharing image data from the prospective of the originating terminal (e.g., the first terminal in the above-described embodiments) of the image data. The originating terminal can have an image-rendering application installed. The method of this embodiment can include the following steps.

S301: When detecting that an image is being rendered on the rendering interface of the image rendering application of the first terminal (i.e., originating terminal), the second terminal can obtain the image information of the image being rendered and the location information associated with the image information.

The location information can be used for indicating a location of the corresponding image on the rendering interface. The location information can be information for a location area including, for example, the position coordinates of each boundary of the image. The image information can be used for indicating the image's shape, color, and other information, so that the image rendered at the first terminal can be fully re-rendered at the second terminal.

S302: The first terminal can transmit a first image data to the server, the first image data including the image information and location information.

The server can be any server that can provide an instant messaging application or data sharing application, and can also be a terminal serving as a server in a LAN.

S303: The first terminal can render and display the image based on the image information at the location corresponding to the location information.

Furthermore, the first terminal can also receive second image data transmitted by the server, either before or after any of the above described steps, and execute the following step S304.

In addition, when the first terminal receives the second image data transmitted by the server, the first terminal can render an image based on the shared image information in the second image data at a location corresponding to the shared location information in the second image data on a rendering interface of the first terminal. The second image data can include the shared image information and the location information associated with the shared image information.

The shared image information and the associated shared location information can be used to indicate, respectively, the image information of the image being rendered on the rendering interface of the second terminal and a location associated with the image information. The method in which the second terminal obtains the shared image information and shared location information can be similar to the method used by the first terminal.

In the embodiments of the present disclosure, when it is detected that a user launches an image-rendering application to render image, image information and location of the image information can be detected at any particular moment and transmitted to other image-sharing terminals (e.g., the second terminal in the embodiments described above). The other image-sharing terminals can render and display the image based on the image data at a corresponding location on the graphical interface of an image-rendering application. Other users can continue to render the image already being rendered in the image-rending application at the second terminal.

Figure 6:
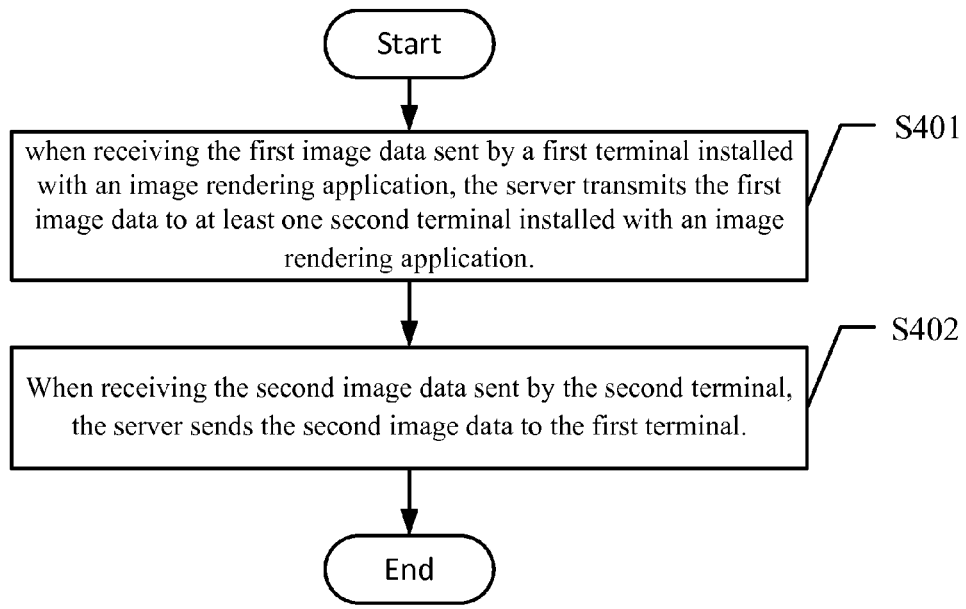
FIG. 6 is a flowchart illustrating exemplary steps of a method for sharing image data, according to an embodiment of the present disclosure.

FIG. 6 is a flowchart illustrating exemplary steps of a method for sharing image data, according to an embodiment of the present disclosure. This embodiment of the disclosure describes in detail the image data sharing method from the server's prospective. The method can include the following steps.

S401: when receiving the first image data sent by a first terminal installed with an image rendering application, the server can transmit the first image data to at least one second terminal installed with an image rendering application. The first image data can include image information and its corresponding location information.

S402: When receiving the second image data sent by the second terminal, the server can send the second image data to the first terminal. The second image data can include shared image information and its corresponding shared location information.

Optionally, if the server itself is also a terminal installed with an image rendering application and sharing images with other terminals, when the server receives the first image data sent by the first terminal, the server can also render an image based on the image information in the first image data at a location corresponding to the location information in the first image data on a rendering interface of its image rendering application.

When the server receives the second image data sent by the second terminal, it can also render an image based on the shared image information in the second terminal at a location corresponding to the shared location information in the second image data on its rendering interface.

In the embodiments of the present disclosure, when it is detected that a user launches an image rendering application to render image, image information and location information of the image information can be detected at any particular moment and transmitted to at least one other image-sharing terminal. The at least one other image-sharing terminal can render and display the image based on the image information at a corresponding location on the graphical interface of an image-rendering application. Other users can continue to render the image already being rendered in the image-rending application at the second terminal.

The following is a detailed description of an exemplary image data sharing system and related devices, according to embodiments of the present disclosure.

Figure 7:
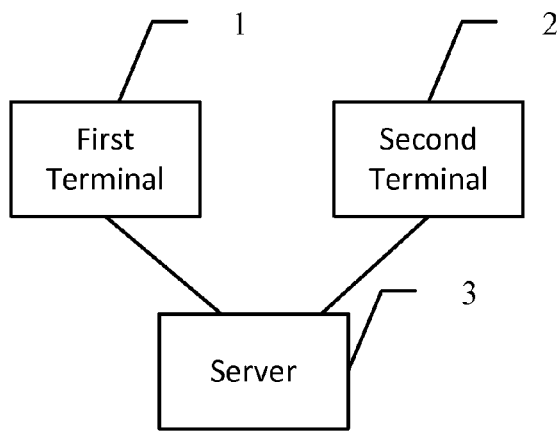
FIG. 7 is block diagram illustrating an exemplary structure of an image data sharing system, according to an embodiment of the present disclosure.

FIG. 7 is block diagram illustrating an exemplary structure of an image data sharing system, according to an embodiment of the present disclosure. The system can include: first terminal 1 and second terminal 2, each installed with an image rendering application, and server 3.

When detecting an image being rendered on the rendering interface of its image rendering application, the first terminal 1 can obtain image information of the image being rendered and the corresponding location information and transmit a first image data to the server 3, the first image data including the image information and location information.

The server 3 can be used to send the first image data to the second terminal 2.

The second terminal 2 can render an image based on the received the first image data. The image can be rendered based on the image information at a location area corresponding to the location information on a rendering interface of the image rendering application at the second terminal 2.

The location information can be used to indicate the location of the corresponding image on the rendering interface. The location information can be location area information including, for example, position coordinates of each boundary of the image. The image information can be used to indicate the image's shape, color, and other information, so that the image rendered at the first terminal can be fully re-rendered at the second terminal.

The server 3 can be any server providing an instant messaging application or data sharing application, and can also be a terminal serving as a server in a LAN. The server 3 can record a terminal ID, such as an IP address or account number, of each terminal in the system. The server 3 can, based on the terminals' identifications, broadcast the first image data to at least one other terminals, for example, sending the first image data from the first terminal 1 to the second terminal 2 based on the terminal ID of the second terminal 2.

After receiving the first image data, the second terminal 2 can render an image at a corresponding location of the image-rendering interface to allow the user at second terminal 2 to continue to render the image on the image-rendering interface of second terminal 2.

In one embodiment, when every terminal simultaneously or successively acts as the originating terminal, the server 3 can also manage the transmissions of the shared data. The originating terminal (e.g., first terminal 1) transmitting the image data can be required to apply for a permission token from the server before transmitting the image data to the server. Based on the image data currently being processed, the server can determine, in response to the request, whether to return a token indicating that the image data can be transmitted. For example, when the quantity of the current image data has not reached a preset threshold value (e.g., two stripes), the server can respond to the request and send the token to the first terminal 1. Having received the token, the originating terminal (e.g., first terminal) can transmit image data including image information and location information.

In addition, when receiving a second image data transmitted by the server 3, the first terminal 1 can also be used for rendering an image based on the shared image information in the second image data at a location on its image-rendering interface based on the shared location information in the second image data. The second image data can include shared image information and the corresponding shared location information.

The shared image data information and the corresponding shared location information can indicate, respectively, image information of the image being rendered on the image-rendering interface of second terminal 2 and the location of the image.

Optionally, the server 3 can also be an image-sharing terminal. The server 3 can also be installed with an image-rendering application. When receiving the first image data from the first terminal 1, the server 3 can also be used for rendering an image based on the image information in the first image data at a location on the image-sharing interface corresponding to the location information in the first image data. In addition, when receiving the second image data from the second terminal 2, the server 3 can also render an image based on the image information in the second image data at a location on the image-sharing interface corresponding to the location information in the second image data.

The first terminal 1 and second terminal 2 can establish connections with the server 3 using the methods of the embodiments described above.

In the embodiments of the present disclosure, when it is detected that a user launches an image rendering application to render image, image information and location of the image information can be detected at any particular moment and transmitted to at least one other image-sharing terminal. The at least one other image-sharing terminal can render and display an image based on the image information at a corresponding location on a graphical interface of the image-rendering application. Other users can continue to render the image already being rendered in the image-rending application at the second terminal.

Figure 8:
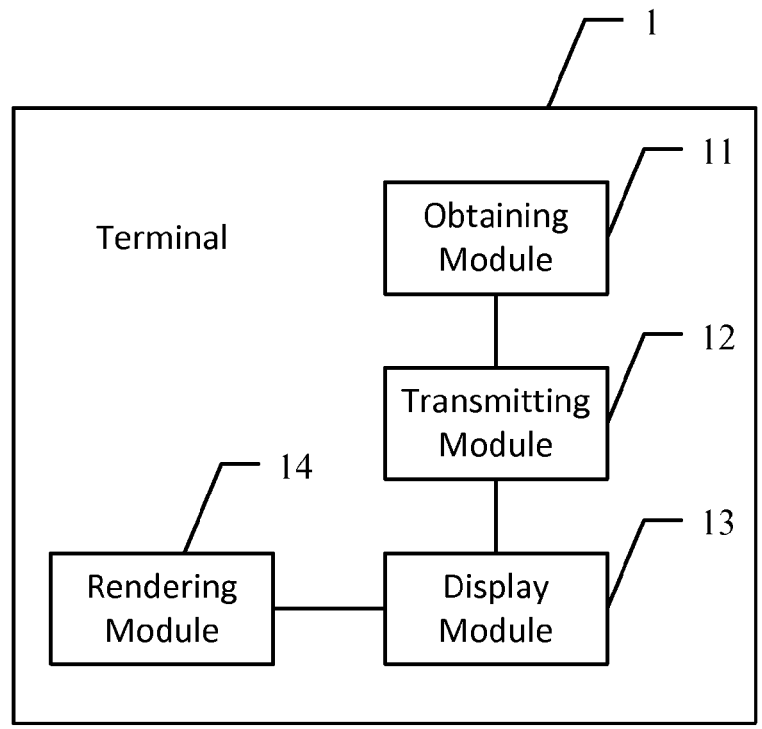
FIG. 8 is a block diagram illustrating an exemplary structure of a terminal for facilitating the sharing of image data.

FIG. 8 is a block diagram illustrating an exemplary structure of a terminal for facilitating the sharing of image data. The terminal of this embodiment can be the first terminal 1 in the above embodiment. The terminal of this embodiment can include the following modules.

Obtaining module 11 that can obtain image information of an image being rendered and location information associated with the image information, when detecting the image being rendered on an image-rendering interface of a first image-rendering application.

Transmitting module 12 that can transmit a first image data to the server, the first image data including the image information and location information.

Display module 13 that can display an image based on the image data at a location corresponding to the location information.

The terminal can further include the following modules.

Image-rendering module 14 that can render an image based on shared image information in the second image data at a location on an image-rendering interface corresponding to the location information in the second image data, when receiving the second image data from the server. The second image data can include shared image information and associated shared location information.

The shared image information and the shared location information can indicate, respectively, the image information of an image being rendered on the image-rendering interface of the second terminal and the location of the image.

Figure 9:
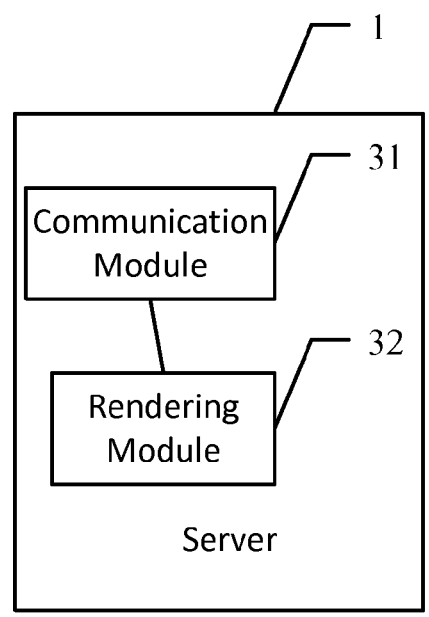
FIG. 9 is a block diagram illustrating an exemplary structure of a server for facilitating the sharing of image data, according to an embodiment of the disclosure.

FIG. 9 is a block diagram illustrating an exemplary structure of a server for facilitating the sharing of image data, according to an embodiment of the disclosure. The server in this embodiment can be the server 3 in the above-described embodiment. The server in this embodiment can include the following modules.

Communication module 31 that can, when receiving a first image data transmitted from the first terminal installed with an image-rendering application, transmit the first image data to at least one second terminal installed with an image-rendering application and sharing image data with the first terminal. The first image data can include image information and the location information associated with the image information. The communication module 31 can also be used for, when receiving a second image data from the second terminal, transmitting the second image data to the first terminal. The second image data can include shared image information and shared location information associated with the shared image information.

Image-rendering module 32 that can, when receiving a first image data from the first terminal, render an image based on the image information in the first image data at a location of the image-rendering application corresponding to the location data in the first image data. The image-rendering module 32 can also be used for, when receiving a second image data, rendering an image based on the shared image information in the second image data at a location of the image-rendering interface corresponding to the shared location information in the second image data.

In the embodiments of the present disclosure, when it is detected that a user launches an image rendering application to render image, image information and location of the image information can be detected at any particular moment and transmitted to at least one other image-sharing terminal. The at least one other image-sharing terminals can render and display an image based on the image information at a corresponding location on the graphical interface of an image-rendering application. Other users can continue to render the image already being rendered using the image-rending application at the second terminal.

Based on the above-described embodiments, a person skilled in the art can understand that parts of or the whole process described in each of the above embodiments can be performed by hardware in accordance with instructions from one or more computer programs. The one or more computer programs can be stored in a non-transitory readable medium, and when executed, perform the processes described in these embodiments. The non-transitory computer readable medium can be a floppy disk, CD, read-only memory (ROM), or random access memory (RAM).

In some embodiments, one or more of the modules in FIGS. 8 and 9 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 10:
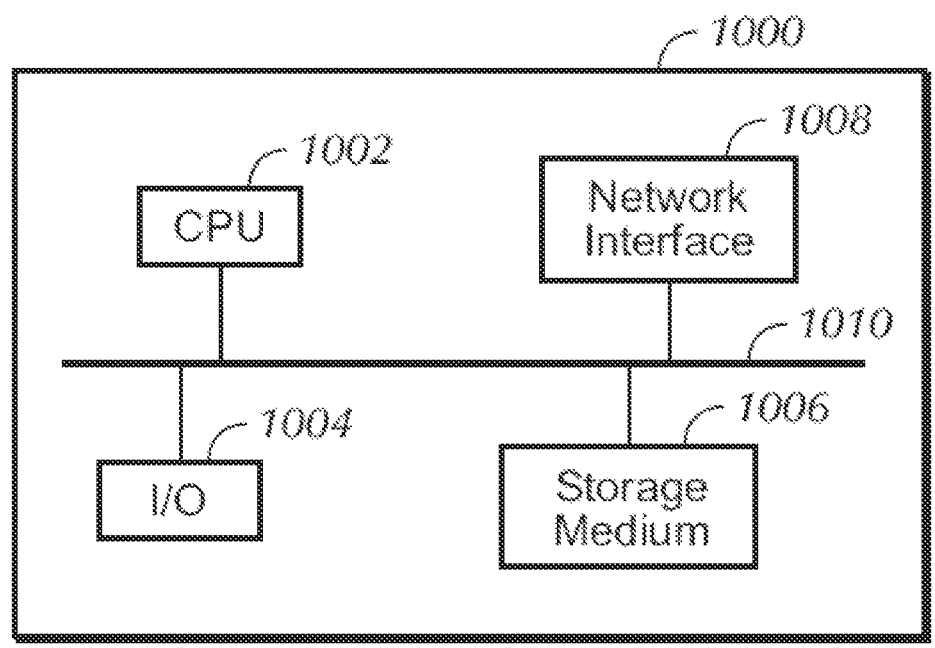
FIG. 10 is a block diagram illustrating exemplary common components of a system that can be either a server or a terminal, according to an embodiment of the disclosure.

The non-transitory computer readable storage medium can be part of a computing system serving as a server or a terminal. FIG. 10 illustrates exemplary common components of one such computing system. As illustrated, the system 1000 can include a central processing unit (CPU) 1002, I/O components 1004 including, but not limited to one or more of display, keypad, touch screen, speaker, and microphone, storage medium 1006 such as the ones listed in the last paragraph, and network interface 1008, all of which can be connected to each other via a system bus 1010. The storage medium 1006 can include the modules of FIGS. 8 and 9 depending on whether the system is a server or a cloud-connecting device.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A terminal for sharing image data, the terminal installed with an image-rendering application, the terminal comprising:
an obtaining module that, when detecting an image being rendered on a rendering interface of the image-rendering application, obtains image information and associated location information of the image,
a transmitting module that transmits a first image data to a server, the first image data comprising the image information and the location information,
a displaying module that displays the rendered image based on the image information at a location corresponding to the location information;
wherein: the transmitting module is further configured to send a request for a permission token to the server before transmitting the first image data, and to transmit the first image data when receiving the permission token returned from the server; and the server determines whether to return the permission token based on a quantity of current image data being processed on the server.

2. The terminal of claim 1, comprising:
a rendering module that, when receiving a second image data transmitted by the server, rendering, on the rendering interface, an image based on shared image information in the second image data at a location corresponding to shared location information in the second image data, the second image data comprising the shared image information and the associated shared location information,
wherein, the shared image information and shared location information are detected by another terminal and indicate, respectively, image information of an image being rendered on a rendering interface of the other terminal and a location associated with the image information.

3. A server for facilitating data sharing, comprising:
a communication module that, when receiving a first image data transmitted by a first terminal installed with a first image-rendering application, transmitting a first image data to a second terminal installed with a second image-rendering application, the second terminal sharing images with the first terminal, the first image data comprising image information and associated location information, the first terminal having requested and received a permission token from the server before transmitting the first image data,
wherein the communication module, when receiving a second image data transmitted by the second terminal, transmits the second image data to the first terminal, the second image data comprising shared image information and associated shared location information, the second terminal having requested and received the permission token from the server before transmitting the second image data, and
wherein before receiving an image data, the communication module receives a request for the permission token from a terminal, and determines whether to return the permission token to the terminal based on a quantity of current image data being processed on the server.

4. The server of claim 3, wherein the server is installed with an image-rendering application and comprises:
a rendering module that, when receiving the first image data from the first terminal, renders, on a rendering interface of the image rendering application, an image based on the image information in the first image data at a location corresponding to the location information in the first image data,
wherein the rendering module, when receiving the second image data from the second terminal, renders, on the rendering interface, an image based on the shared image information in the second image data at a location corresponding to the shared location information in the second image data.

5. The server of claim 4, wherein:
when the server detects a third image being rendered on the rendering interface of the image rendering application in response to a user input, the server obtains a third image data including image information and associated location information of the third image, and the communication module transmits the third image data to the first terminal and the second terminal.

6. The server of claim 3, wherein:
when the quantity of the current image data being processed by the server is less than a threshold value, the server determines to return the permission token.

7. The server of claim 3, wherein:
the server creates a WiFi hotspot using network card resources on the server, and broadcasts a hotspot ID; and
the first terminal and the second terminal access the communication module based on the hotspot ID.

8. The server of claim 3, wherein:
the first terminal, the second terminal, and the server respectively transmit an individual network device information to a third-party network-building server for establishing connections for image data sharing;
when determining that the first terminal and the server can be connected, the third-party network-building server passes the network device information of the first terminal and the network device information of the server to each other to establish a connection between the first terminal and the server; and
when determining that the second terminal and the server can be connected, the third-party network-building server passes the network device information of the second terminal and the network device information of the server to each other to establish a connection between the second terminal and the server.

9. A device comprising:
a rendering module that creates or modifies a first data,
an obtaining module that obtains a first information associated with the first data created or modified by the rendering module, the first information enabling reproduction of the first data at a first terminal without requiring transmission of the first data to the first terminal, and
a transmitting module that transmits the obtained first information to the first terminal through a server after the device requests and receives a permission token from the server for transmitting the first information,
wherein the rendering module reproduces a second data based on a second information received from the first terminal through the server after the first terminal requests and receives the permission token from the server for transmitting the second information, the second information associated with the second data and enabling reproduction of the second data,
and wherein when receiving a request for the permission token, the server determines whether to return the permission token based on a quantity of current image data being processed on the server.

10. The device of claim 9, wherein the first data comprises image data and the rendering module comprises an image-rendering application.

11. The device of claim 10, wherein the first information comprises image information and location information.

12. The device of claim 11, wherein the image information comprises at least a color and a shape associated with the image.

13. The device of claim 10, comprising a receiving module that receives the second information from the first terminal.

14. The device of claim 13, wherein the device receives a third information from the first terminal using the receiving module and forwards the received third information to a second terminal using the transmitting module without requiring reproduction of data from the third information through the server after the device requests and receives a permission token from the server for transmitting the third information.

15. The device of claim 10, comprising a display module that displays the first data and the second data.

16. The device of claim 10, wherein the transmitting module transmits the first data to the first terminal via the server.

17. The device of claim 10, wherein the transmitting module transmits the first information to more than one first terminal at the same time.

18. The terminal of claim 10, wherein the terminal comprises a mobile device or a computer.

19. A non-transitory computer-readable storage medium of a device, the storage medium storing a program, which when executed by a process, performs the steps of:
processing a first data,
extracting a first information associated with the processed first data, the first information enabling reproduction of the first data at a first terminal without requiring transmission of the first data,
transmitting the obtained first information to the first terminal through a server after the device requests and receives a permission token from the server for transmitting the first information,
receiving a second information from the first terminal, the second information associated with a second data and enabling reproduction of the second data through the server after the first terminal requests and receives the permission token from the server for transmitting the second information, and
re-producing the second data based on the received second information,
wherein when receiving a request for the permission token, the server determines whether to return the permission token based on a quantity of current image data being processed on the server.

* * * * *